United States Patent [19]
Gates et al.

[11] Patent Number: 5,799,231
[45] Date of Patent: Aug. 25, 1998

[54] VARIABLE INDEX DISTRIBUTED MIRROR

[75] Inventors: Stephen McConnell Gates, Ossining, N.Y.; Anthony C. Lowe, Braishfield, United Kingdom; Bardia Pezeshki, San Jose, Calif.

[73] Assignee: International Business Machines Corporation, Armonk, N.Y.

[21] Appl. No.: 687,311

[22] Filed: Jul. 25, 1996

[51] Int. Cl.⁶ .................... G02F 1/1335; G02F 1/1337; G02F 1/1333; G02F 1/13
[52] U.S. Cl. .................... 349/115; 349/123; 349/138; 349/193; 349/78
[58] Field of Search .................... 349/74, 76, 78, 349/185, 138, 81, 115, 193, 123

[56] References Cited

U.S. PATENT DOCUMENTS

| | | | |
|---|---|---|---|
| 3,910,681 | 10/1975 | Elliott et al. | 349/114 |
| 4,012,119 | 3/1977 | Adams et al. | 349/30 |
| 4,838,655 | 6/1989 | Hunahata et al. | 349/5 |
| 4,917,465 | 4/1990 | Conner et al. | 349/5 |
| 5,103,340 | 4/1992 | Dono et al. | 359/578 |
| 5,142,414 | 8/1992 | Koehler | 359/578 |
| 5,150,236 | 9/1992 | Patel | 349/198 |
| 5,240,636 | 8/1993 | Doane et al. | 349/89 |
| 5,251,049 | 10/1993 | Sato et al. | 349/43 |
| 5,309,262 | 5/1994 | Haas | 349/29 |
| 5,321,539 | 6/1994 | Hirabayashi et al. | 349/198 |
| 5,325,218 | 6/1994 | Willet et al. | 349/115 |
| 5,493,430 | 2/1996 | Lu et al. | 349/185 |
| 5,570,216 | 10/1996 | Lu et al. | 349/84 |
| 5,592,314 | 1/1997 | Ogasawa et al. | 349/74 |

OTHER PUBLICATIONS

Tanaka et al., "A Liquid–Crystal/Polymer Optical Device Formed by Holography for Reflective Color Display Applications", Proc. 13th International Display Research Conference (1993) pp. 109–111.

Doane et al., "Front–Lit Panel Display from polymer Stabilized Cholesteric Textures", Japan Display (1992) pp. 73–76.

Lowe et al., "Order Parameter and the Performance of Nematic Guest–Host Displays" Mol. Cryst. Liq. Cryst. vol. 66, (1981) pp. 309–318.

*Primary Examiner*—William L. Sikes
*Assistant Examiner*—Toan Ton
*Attorney, Agent, or Firm*—Scully, Scott, Murphy & Presser

[57] ABSTRACT

A variable index distributed mirror is disclosed used for high resolution reflective displays that are thin and have high resolution, reflectivity and contrast; wide viewing angle; low power consumption; and low voltage operation. The mirror is electrically switchable or variable between substantially transparent and reflective states. The mirror has alternating layers of a first material having a fixed refractive index, and a second material having a variable refractive index. The second material may be a nematic liquid crystal. The alternating layers are located between a pair of electrodes. The variable refractive index approximately equals the fixed refractive index in the transparent state and differs from the fixed refractive index in the reflective state. The variable refractive index varies in response to a signal applied across the electrodes. The mirror is tuned to a particular color to form a monochrome display. Three such mirrors, each individually driven and tuned to different colors, form a color display. For a black and white monochrome display, the three mirrors are driven collectively.

21 Claims, 7 Drawing Sheets

VARIABLE INDEX DISTRIBUTED MIRROR

BACKGROUND OF THE INVENTION

1. Field of the Invention

The present invention is directed to a variable index distributed mirror, and more particularly, to a multi-layer mirror which is variable between transparent and reflective states.

2. Discussion of the Prior Art

Multi-layer mirrors are frequently used for optical coatings and electro-optical devices. Generally, if a dielectric layer is one quarter of a wavelength thick, and surrounded on top and bottom sides by another material, then a reflection from each of the top and bottom interfaces add in phase. This is referred to as constructive interference. The constructive interference of the two reflections increases reflectivity of the quarter-wave dielectric layer.

Figure 1:
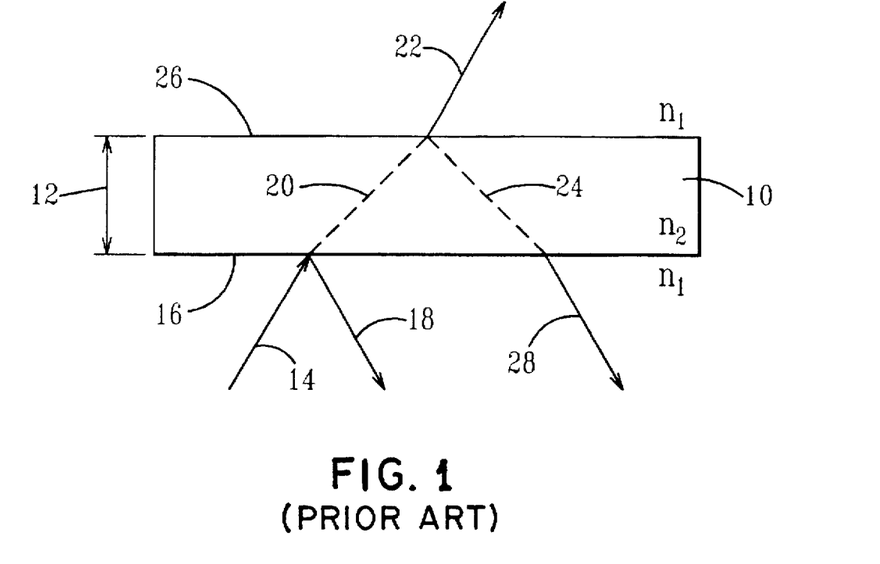
FIG. 1 shows the effect of a conventional dielectric layer on light.

FIG. 1 shows a dielectric layer 10 that has a thickness 12 equaling $\lambda/4$, where $\lambda$ is the wavelength of light incident thereon. Light 14 incident on a receiving interface 16 is reflected 18 and refracted 20 therefrom. Light refraction occurs due to differences in refractive indices $n_1$, $n_2$ of the medium on both sides of the incident interface 16.

The refracted light 20, in turn, refracts 22 and reflects 24 from an opposing interface 26 of the dielectric 10. Upon reflection from the opposing interface 26, the reflected light ray 24 undergoes a phase shift of $\pi$ radians with respect to the refracted light 20 incident on the opposing interface 26. The light 24 reflected from the opposing interface 26 also refracts and reflects from the incident interface 16. The refracted light from the incident interface 16 exiting the dielectric 10 is shown as reference 28 in FIG. 1.

The refracted 28 and reflected 18 light rays from the incident interface 16 add in phase since the thickness 12 of the dielectric layer 10 is $\lambda/4$, and the phase change upon reflection from the opposing interface 26 is $\lambda/2$. This increases the reflectivity of the dielectric layer 10. The inventive multi-layer mirror provides a reflective display that uses this principle to maximize reflection in one mode.

Conventional displays do not provide certain desired characteristics simultaneously. One of the major issues facing the portable computer industry is the need for displays that have the following characteristics: high resolution, relatively wide viewing angles, and low power consumption. Conventional displays optimize only one of these characteristics, since optimization of one characteristic generally leads to degradation of the remaining characteristics.

Existing solutions address these characteristics individually. For example, different display technologies offer the prospect of high display resolution equaling that of laser printers, e.g., 80 µm pitch. Other displays have wide viewing angles of up to ±45°. In addition, there are displays that consume low power, e.g., less than 1 watt. However, efforts to collectively meet all three requirements simultaneously have not been successful. Furthermore, conventional displays require polarizers and backlights to increase reflectivity and contrast. Polarizers and backlights increase the size and power consumption of such displays.

One conventional display uses a polymer stabilized cholesteric texture (PSCT) structure. In response to a voltage, a PSCT display electrically switches between reflective and transmissive states. In the reflective state, light is reflected by Bragg reflection over a band of wavelengths. In the transmissive state, light is forward-scattered. PSCT displays have many disadvantages, such as high switching voltages.

For example, a three layer stack PSCT mirror has a switching voltage in excess of 100 volts. In addition, each layer in the stack operates only on one polarization of light, reflecting either left-handed or right-handed circular polarized light. Therefore two layers are required for each color. This increases thickness and cost of PSCT displays. PSCT displays also have slow switching speeds. Thus, to achieve video rates, complex active matrix circuits are required.

Other conventional displays use electrically switchable holograms, where a hologram of a color-selective mirror is produced by photo-polymerization/phase separation of a monomer/nonreactive nematic system or by photo-polymerization of a monomer system which produces a hologram containing air voids which can subsequently be back-filled with a nematic material. The chemistry is similar to that used to make polymer dispersed liquid crystal (PDLC) materials. Nematic domains of holographic displays are electrically switched from an index-unmatched state, where diffraction occurs and the hologram is functional, to an index-matched state where the display is non-scattering and transparent. Disadvantages of holographic displays include not having sufficiently broad bandwidths and viewing angles, low reflective efficiencies and significant wavelength dependence on viewing angle. In addition, approximately 100 volts per color is required to switch holographic displays.

Therefore, conventional displays do not simultaneously have high resolution, wide viewing angle and low power consumption. Conventional displays are thick, operate at high voltages, have slow switching rates and narrow bandwidths, and require complex switching matrix circuits.

Simultaneously attaining high resolution, wide viewing angle, and low power consumption would significantly enhance widespread use of battery operated portable computers and other devices that have displays.

SUMMARY OF THE INVENTION

The object of the present invention is to provide an electro-optical device that eliminates the problems of conventional displays.

Another object of the present invention is to provide an electro-optical device that has high resolution, consumes low power and exhibits a wide viewing angle.

A further object of the present invention is to provide an electro-optical device that is relatively thin, requires no backlight or polarizers for proper operation, and has high reflectivity and contrast.

The present invention accomplishes the above and other objects by providing an electro-optical device, which is variable between transparent and reflective states. The inventive electro-optical device is a variable index distributed mirror or display. In the transparent state, light passes through the device and is absorbed. Thus, the transparent state appears dark.

The variable index distributed mirror of the present invention is electrically variable between substantially transparent and reflective states. The mirror comprises a stack of alternating layers of a first material having a fixed refractive index, and a second material having a variable refractive index. The second material is an electro-optically active material. The alternating layers are located between a pair of substantially transparent conductive electrodes.

The variable refractive index approximately equals the fixed refractive index in the transparent state and differs from the fixed refractive index in the reflective state. The variable refractive index varies in response to a signal applied across the electrodes. The signal is provided by a signal source which applies a signal across the electrodes through a control circuit or driver. The driver may be formed over a substrate and the mirror stack formed over the driver. The mirror stack is tuned to a particular color to form a monochrome color pixel. A matrix or array of the variable index distributed mirrors forms a display.

In another embodiment of the inventive electro-optical device, a color pixel and display is realized by vertically stacking and individually driving three mirrors. The three mirrors are tuned, for example, to red, green and blue colors, respectively. For a black and white monochrome display, the three mirrors are driven collectively.

The mirror is tuned to a particular color by having the thickness of the alternating layers equal to $\lambda/4$, where $\lambda$ is a wavelength of the particular color light. To increase a wave band of the mirror, the layer thicknesses may be progressively varied from $\lambda/4$.

Illustratively, the fixed index material is an oxide, nitride, inorganic dielectric or organic polymer. The electro-optically active material having a variable refractive index may be a liquid crystal, such as a nematic liquid crystal. The nematic liquid crystal (NLC) may have positive dielectric anisotropy. In this case, the mirror is transparent in a field-on state, where an electric field is applied across the electrodes.

In the absence of a signal, i.e., in a field-off state, the positively anisotropic NLC may have a molecular axis aligned randomly in parallel to a layer plane. The layer plane is a plane of the boundary surface or interface between the alternating layers. The molecular axis is referred to as the director. Alternatively, the director may be aligned uniformly in parallel to the layer plane. In this case, the director may be rotated, e.g., by 90°, for each successive NLC layers.

In another embodiment, the NLC may have negative dielectric anisotropy and is homeotropically aligned. In this embodiment, the mirror is transparent in the field-off state. This is because the director is aligned perpendicular to the layer plane.

The inventive electro-optical device has many desired characteristics that could not have been achieved simultaneously in conventional displays. The inventive electro-optical device requires neither a backlight nor a polarizer for proper operation. The inventive device consumes low power, operates at low voltages, has a fast response time and a large wave band, and is relatively thin. The thin inventive device is suitable for use as a high resolution reflective display. In addition, the inventive electro-optical device has a wide viewing angle. The resolution, reflectivity and contrast of the inventive electro-optical device are high.

DETAILED DESCRIPTION OF THE INVENTION

An electro-optical device that simultaneously requires high resolution, low power consumption and wide viewing angle limits the technologies that can be used. Illustratively, the technology limitations include the following constraints:

1. The low power consumption requirement precludes the use of a backlight or any emissive display technology. As such, the inventive display is reflective.
2. To achieve satisfactory appearance in a typical ambient light, the inventive reflective display has at least 60% reflectivity. This precludes systems which require polarizers for which the maximum effective reflectivity is 40%.
3. The realization of color by using subtractive filters limits reflectivity to approximately 30%. Therefore, for the inventive display, color is realized by operating successively on the red, green and blue regions of the spectrum.

Figure 2:
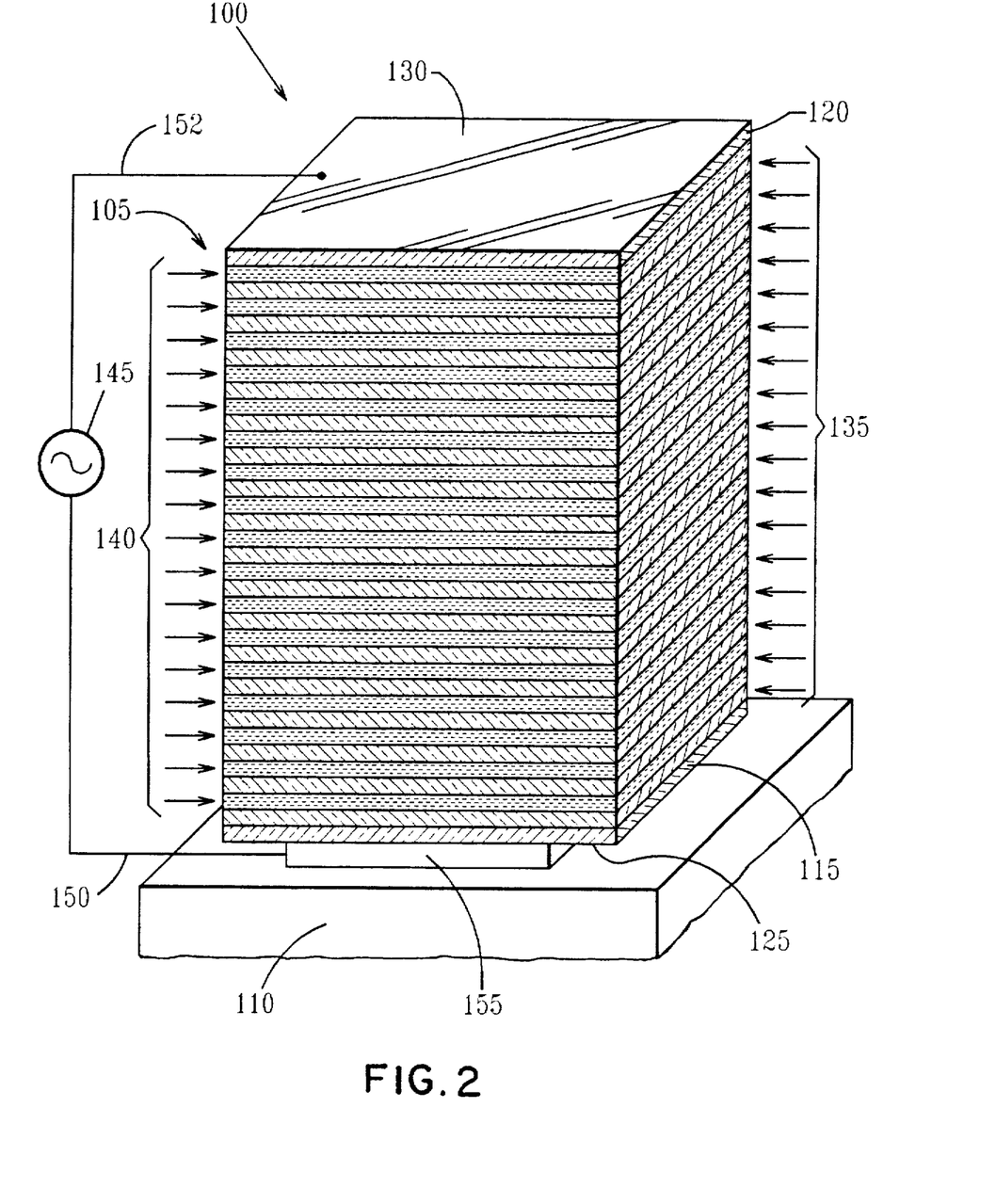
FIG. 2 shows one embodiment of a variable index distributed mirror according to the present invention.

FIG. 2 shows one embodiment of an electro-optical display with a variable index distributed mirror 100 according to the present invention. The mirror 100 is used for a monochrome color pixel. Many of these mirrors 100 arranged in an array or matrix form a monochrome color display.

The mirror 100 has a stack 105 of alternating layers of materials having fixed and variable refractive indices. The stack 105 is positioned over a substrate 110, which may be a glass substrate, or a silicon (Si) substrate. One substantially transparent conducting electrode 120 is located at the top surface 130 of the stack 105. A second substantially light-absorbing conducting electrode 115 is located at the bottom surface 125 of the stack 105. In a transparent state, light passes through the stack 105 and is absorbed. Thus, the transparent state appears dark. Alternatively, the lower electrode 115 may be opaque.

Between the two electrodes 115, 120, two materials are alternatively stacked over each other. One material is a dielectric 135 having a fixed index of refraction $n_{dielectric}$. The dielectric 135 may be isotropic so that its refractive index is independent of the incident light direction. Isotropic dielectrics influence light equally from all directions.

The other material is an optically anisotropic material 140 that has refractive indices $n_{\|}$, $n_{\perp}$, which are respectively parallel and perpendicular to the molecular axis of the anisotropic material 140. Moreover, the molecular orientation, and therefore the affective refractive index, $n_{\mathit{eff}}$, of the anisotropic material 140 varies in response to an electric field.

Illustratively, the optically anisotropic mobile material is a liquid crystal, preferably, a nematic liquid crystal.

The stack 105 is subjected to an electric field which is created by a signal source 145 connected to the electrodes 115, 120 through terminals 150, 152. Illustratively, the signal source 145 may provide an AC signal. For example, the signal may be a sinusoid, sawtooth, ramp, pulse or other types of signals.

A control circuit or driver 155 controls application of the signal across the electrodes 115, 120. Illustratively, the driver 155 is a thin film transistor (TFT) formed between the substrate 110 and the bottom electrode 115. Thus, the signal provided by the signal source 145 is applied to the bottom electrode 115, through the driver 155. The driver 155 progressively varies the strength of the signal. This progressively varies the effective refractive index $n_{eff}$ so that the reflectivity of the mirror 100 is progressively changed.

The alternating materials 135, 140 are arranged such that a first layer of the dielectric 135 is located over the bottom electrode 115, which is in turn located over the substrate 110. A first optically active layer 140 is located over the first dielectric layer 135 to form a pair of layers referred to as a period. Such periods or pairs of layers are stacked over one another. Illustratively, the stack is a 17 period stack. The last layer at the top of the stack 105 is formed from the optically active material 140. This top most optically active layer 140 is covered with the top transparent electrode 120. Alternatively, the number of alternating layers 135, 140 need not be equal in number, and the material forming the first layer may be the same as that forming the last layer of the stack 105. The top side 130 of the stack 105 is exposed to air, or to a solid transparent substrate such as glass, for example. Since reflections at the interface between the top electrode 120 and the medium, e.g., glass or air, cannot by modified by an electric field, it is advantageous that the refractive indices of the top electrode 120 and medium thereabove be substantially matched. This minimizes the difference between the two refractive indices. The same applies to the refractive indices of the top electrode 120 the layer directly below it. That is, the difference between the refractive indices of the top electrode 120 the layer directly below it is minimized.

The stack 105 may be formed by alternatively depositing layers of the dielectric 135 and a sacrificial material (not shown). The sacrificial layers are selectively etched to create openings or voids between the dielectric layers 135. The voids are then filled with the liquid crystal 140. The liquid crystal 140, is incorporated into the mirror 100 by capillary action, after etching the sacrificial layers. Of course, supports are required to maintain the voids between the dielectric layers 135. These supports could also function as vias to provide electrical contact to the electrode layers 115, 120. Finally, a cover is used to contain the liquid crystal 140.

To increase reflectivity of the stack 105, the thickness of each layer is $\lambda/4$ thick, where $\lambda$ is the wavelength of a particular color light and may be from 400 nm to 800 nm. As such, the thickness of each layer $\lambda/4$ is from 100 nm to 200 nm. Such a stack having $\lambda/4$ thick layers is referred to as an anti-resonant stack. Anti-resonant stacks generally have a broad reflectivity span or bandwidth around this quarter wave point, $\lambda/4$.

The wavelength span and reflectivity magnitude of this high reflectivity range is dependent on the refractive indices of the two materials 135, 140. The magnitude of the reflectivity depends, additionally, on the number of periods, or pairs of layers in the stack.

The wavelength span ($\Delta\lambda$), i.e., the full width of the reflection peak at half the maximum intensity (FWHM), is approximately given by equation (1):

$$\frac{\Delta\lambda}{\lambda} = \frac{4}{\pi} \sin^{-1}\frac{n_H - n_L}{n_H + n_L} \qquad (1)$$

Where:

$n_L$ is the refractive index of the dielectric 130, and $n_H$ is the refractive index of the electro-optical material 140 and varies in value.

The maximum reflectivity magnitude R of P periods, on a substrate 110 having a refractive index $n_s$ in air, is given by equation (2):

$$R = \left[ \frac{1 - (n_H/n_L)^{2P}(n_H^2/n_S)}{1 + (n_H/n_L)^{2P}(n_H^2/n_S)} \right]^2 \qquad (2)$$

To obtain the highest reflectivity possible, the maximum discontinuity in the indices is maintained. This is achieved by ending the stack 105 with the highest index layer. Illustratively, the layer at the stack top 130 is the optically active material 140 which has a variable index $n_H$ that exceeds the fixed refractive index $n_L$ of the dielectric 135. This provides the maximum index discontinuity between the air, for example, above the stack top 130 of the stack 105, and the top most layer 140.

The variable index distribute mirror 100 is variable between transparent and progressively reflective states. The varying or switching occurs in response to an electric field applied between the two electrodes 115, 120. The mirror 100 becomes progressively more reflective over a given range as the electric field varies. The reflectivity is increased by increasing the difference between the indices of the alternating layers 135, 140.

In one embodiment, the mirror 100 is transparent in the off-state, i.e., zero reflectivity, when no electric field is applied. Transparency is achieved by having the off-state refractive index of the electro-optic material 140 equal to the fixed refractive index of the dielectric material 135. The mirror 100 is transparent due to absence of index discontinuities therein that cause reflections. As will be discussed, such an electro-optic material 140 may be a nematic liquid crystal which has a negative dielectric anistropy ($\Delta\epsilon<0$) and which is homeotropically aligned.

In the on-state, where an electric field is applied, the mirror 100 is reflective. The mirror 100 becomes progressively more reflective over a given wavelength as the electric field is increased. The mirror 100 becomes more reflective because the increase in the electric field increases the refractive index of the liquid crystal 140, thus increasing the mismatch of the refractive indices of the two materials 135, 140. Illustratively, when all the layers in the stack 105 are $\lambda/4$ for the same wavelength, a reflective bandwidth of about 33 nm to 60 nm is achieved for a refractive index range of 0.15 to 0.3, respectively. The wavelength $\lambda$ can be chosen to achieve a desired background color. As such, the mirror 100 forms a monochrome colored pixel, and a matrix of such mirrors 100 forms a monochrome colored display.

Many displays require a reflective wavelength bandwidth which is greater than that calculated from equation (1). To achieve a larger reflection bandwidth, the thickness $\lambda/4$ of two layers 135, 140 that form a pair (or period) is progressively varied from pair to pair. This is in lieu of all the pairs having layers of the same thickness. A mirror having progressively thicker pairs enhances display operation, since each pair of the progressively thicker pairs is tuned to a different wavelength $\lambda$. The mirror with progressively thicker pairs has an increased bandwidth and operate across the entire required bandwidth. In addition, pairs of different thicknesses minimize off-normal effects to be described, since only one pair of layers in the stack operates at the edge of a desired wave band.

Figure 3A:
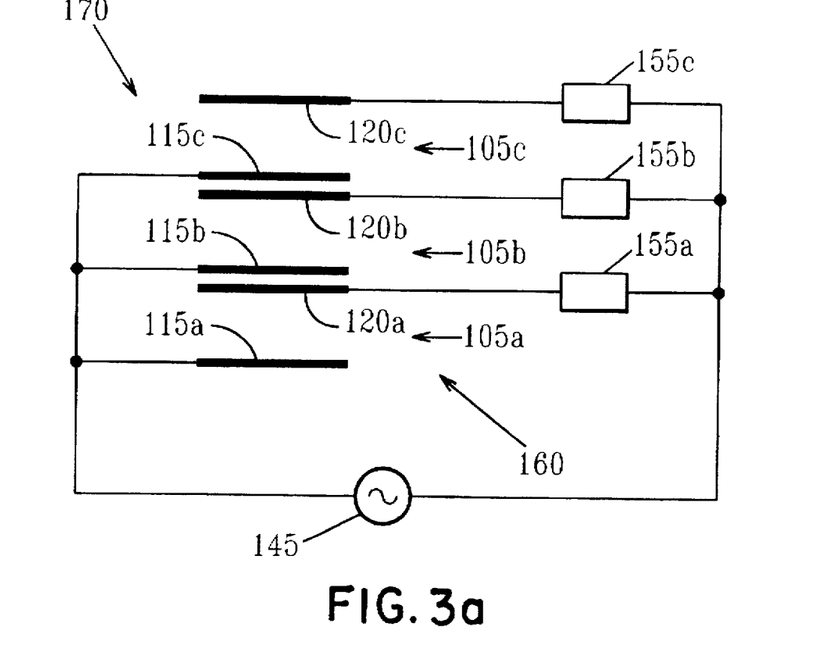
FIGS. 3a, 3b show other embodiments using three variable index distributed mirrors of FIG. 2 stacked over each other according to the present invention.
Figure 3B:
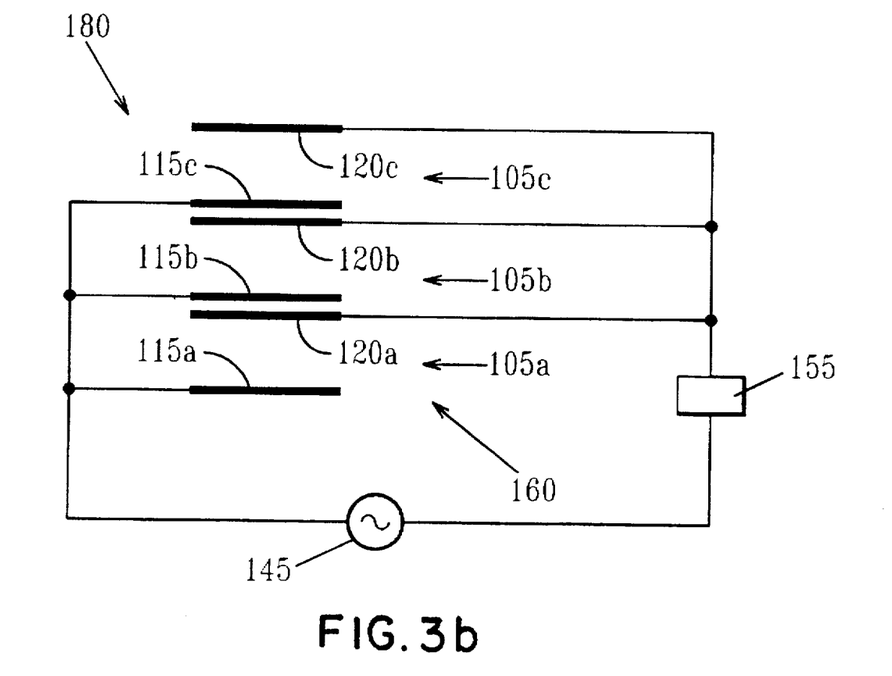

In other embodiments, shown in FIGS. 3a and 3b, several stacks 105 are vertically stacked over one another to form a mirror. For clarity, the alternating fixed and variable index layers 135, 140 (shown in FIG. 2), are omitted from FIGS. 3a, 3b. Illustratively, three stacks 105a, 105b, 105c form a triple stack 160.

FIG. 3a shows a mirror 170 that provides a color pixel, an array of which forms a color display. Each stack 105a, 105b, 105c has a reflectivity range spanning a different region of the visible spectrum. For example, the reflective ranges of the three stacks 105a, 105b, 105c are associated with the three colors, red, green and blue, respectively. This is achieved by having different layer thicknesses λ/4 for the stacks 105a, 105b, 105c, where the value of the wavelength λ determines the color.

In addition, each stack 105a, 105b, 105c is individually addressed, using its own control circuit 155a, 155b, 155c. The control circuits 155a, 155b, 155c have one end collectively connected to the signal source 145, and another end individually connected to one of the electrodes of the stacks 105a, 105b, 105c, respectively. Illustratively, the control circuits 155a, 155b, 155c are connected to electrodes 120a, 120b, 120c, respectively. The other electrodes 115a, 115b, 115c are connected to the signal source 145. By individually controlling the transparency/reflectivity of the red, blue and green color tuned stacks 105a, 105b, 105c, a desired color is achieved.

FIG. 3b shows a mirror 180 that forms a black and white monochrome pixel. An array of such pixels forms a black and white monochrome display. Mirror 180 is similar to mirror 170 of FIG. 3a, except that the transparent electrodes 115a 115b, 115c, and 120a, 120b, 120c of each stack 105a, 105b, 105c are addressed as a single unit. This may be achieved by having a single control circuit 155 for all three stacks 105a, 105b, 105c. Alternatively, individual control circuits or drivers may be shorted together to form a single collective control unit. Collective control of the three color tuned stacks 105a, 105b, 105c, successively adds the color components to form a composite white light. This results in the mirror 180 being a black and white monochrome pixel.

Returning to FIG. 2, the dielectric 135 is selected to have a fixed refractive index of 1.55 ($n_{dielectric}$=1.55), for example, and may be an inorganic dielectric material, such as an oxide or a nitride. Alternatively, the dielectric 110 is an organic polymer film, such as an acrylic.

The optically active material 140 may have an adjustable index that varies between 1.55 and 1.95. For example, liquid crystals are used for the non-linear optical material 140, because their voltage dependent orientation yields large refractive index changes, e.g., from 1 to 2, for small voltage changes. Preferably, the optically active material 140 is a nematic liquid crystal.

A nematic liquid crystal (NLC) has uniaxial symmetry, where the molecular long axis is referred to as the director. In response to an electric field, the director changes orientation between states which are parallel and perpendicular to a layer plane. The layer plane designates the plane onto which the liquid crystal 135 is formed, i.e., the plane of the boundary surface or interface between the fixed and variable index materials 135, 140. The orientation change of the director varies the index of refraction of the liquid crystal.

The index of refraction in a direction perpendicular to the director is referred to as n perpendicular ($n\perp$). Similarly, the index of refraction in a direction parallel to the director is referred to as n parallel ($n_\parallel$). Illustratively, the nematic has $n\perp$ that equals to 1.55, and $n_\parallel$ in the range from 1.75 to 1.95. The mirror 100 is transparent when n perpendicular $n\perp$ of the nematic 145 equals the fixed dielectric refractive index $n_{dielectric}$, i.e., when $n_{dielectric}$=$n\perp$=1.55.

For a nematic with positive dielectric anistropy ($\Delta\epsilon$>0), with no applied voltage (field-off state), the director is horizontal and parallel to the layer plane. However, in an applied field (field-on state), the director is oriented perpendicular to the layer plane. In an embodiment that uses such a nematic, the mirror 100 is transparent in the field-on state, where the nematic's field-on refractive index is $n\perp$.

Another embodiment uses a nematic having negative dielectric anistropy ($\Delta\epsilon$<0) and which is homeotropically aligned, i.e., aligned with the director perpendicular to the layer plane. The field-off refractive index of such a nematic is $n\perp$. In this embodiment, the index-matched or transmissive state is the field-off state. Thus, without an applied voltage, the indices of layers 135, 140 are matched, and no index discontinuities are present. The matched stack results in a mirror with zero reflectivity. As the index of the liquid crystal layers 140 is changed by application of the electric field, the mirror 100 becomes more reflective over a particular wavelength λ range, where the layers are approximately λ/4 thick.

Figure 4:
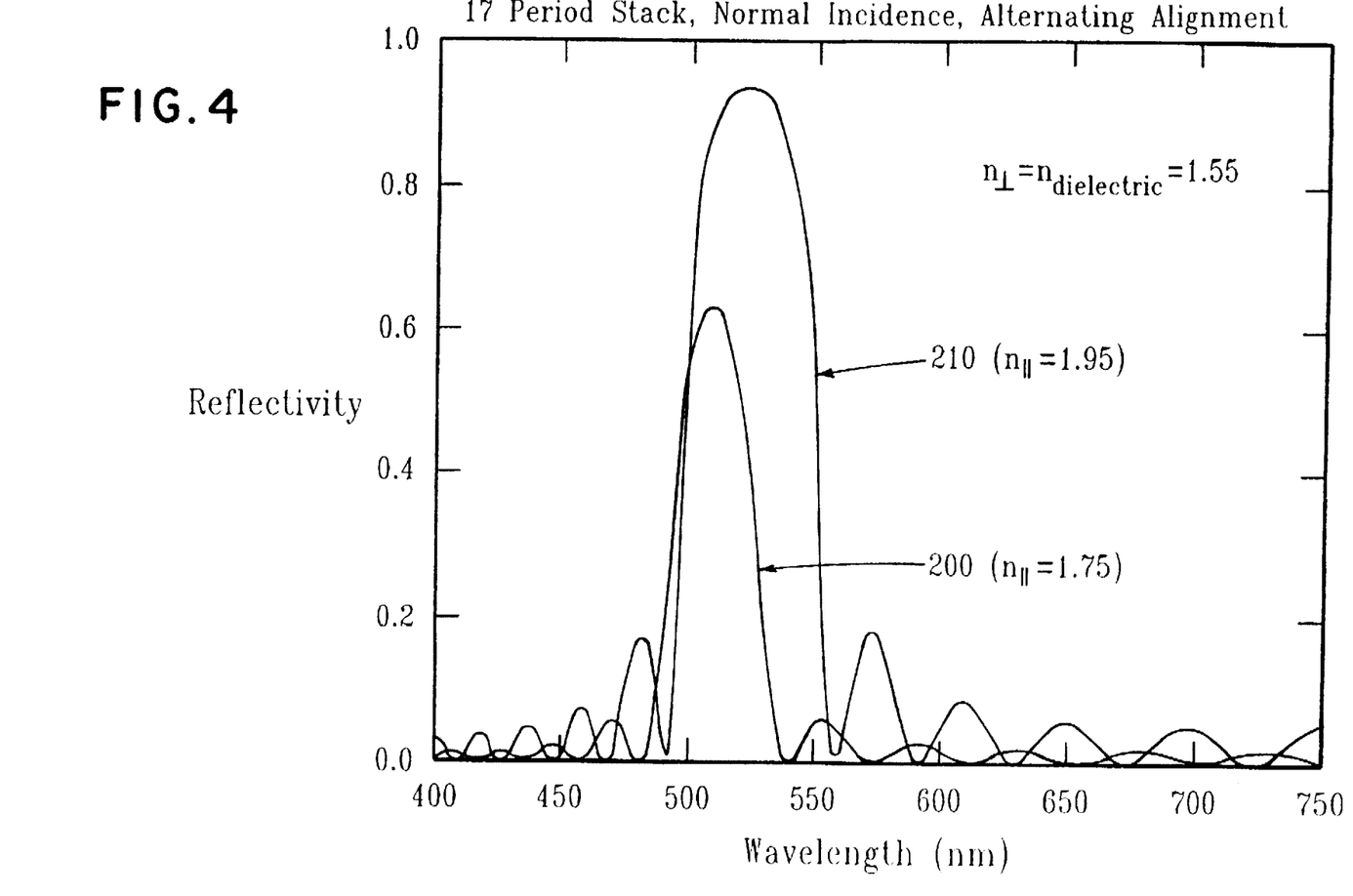
FIG. 4 is a graph of reflectivity versus wavelength, at normal incident light, illustrating the effect of varying the reflective index of the variable index distributed mirror of FIG. 2 according to the present invention.

The reflective change of the mirror 100 is shown in FIG. 4, which is a graph of reflectivity versus wavelength at normal incident light. FIG. 4 illustrates the effect of varying the parallel reflective index $n_\parallel$ of the nematic 140 from 1.75 to 1.95. FIG. 4 is for a 17 period stack, where light incident on the stack 105 is perpendicular to the stack's top surface 130. This is referred to as normal incidence. The index of refraction of the dielectric 135 and the field-off refractive index of the nematic $n\perp$, used in connection with FIG. 4, are equal to 1.55; i.e., $n_{dielectric}$=$n\perp$=1.55.

Curves 200 and 210 are the calculated reflectivities for two different nematics 140 where the parallel index of refraction, $n_\parallel$, is 1.75 and 1.95, respectively. The high reflectivity between approximately 500 nm to 550 nm shows that high reflectivity and contrast are obtained. A thick layer of dielectric surrounds the stack on both sides for the calculations yielding curves 200, 210 of FIG. 4. Of course, for no applied electric field, where the indices of the dielectric 135 and nematic 140 are equal, ($n_{dielectric}$=$n\perp$= 1.55), reflectivity is zero, and the mirror is transparent.

If the center wavelength is made to correspond to one of the primary colors, then the display or mirror 100 will exhibit higher reflectivity at that particular color as $n\perp$ is increased. This is shown in FIG. 4, where the magnitude of the reflectivity, shown on the vertical axis, is larger for curve 210 ($n_\parallel$=1.95). This is because curve 210 is for a larger $n_\parallel$ than curve 200 ($n_\parallel$=1.75), resulting in a larger index discontinuity relative the this fixed dielectric index ($n_{dielectric}$=1.5).

As can be seen from FIG. 4, there is a slight shift to the longer wavelengths as the parallel refractive index $n_\parallel$ of the nematic 140 is increased from 1.75 to 1.95. This wavelength shift or change in color with intensity is a second order effect, and can be compensated in the design of the stack.

Factors other than changes in the electric field also affect the value of the effective refractive index $n_{eff}$ of the nematic. These factors also affect the reflectivity of the mirror 100. The effective refractive indices of the nematic LC is a function of:

1. the angle φ between the director and the plane of incidence;
2. the angle ψ of propagation of light in the layer; and
3. the order parameter, S, which describes the mean instantaneous angle between the nematic director and its time-averaged direction.

The following discussion applies to a nematic with positive dielectric anistropy ($\Delta\epsilon>0$). However, it is understood that a nematic with negative dielectric anistropy ($\Delta\epsilon<0$) may also be used.

For a nematic having a positive dielectric anistropy ($\Delta\epsilon>0$), the average values of the refractive index n, for all values of $\phi$ and $\psi$, are calculated using equations (3) to (6). This is similar to a method described in *Order Parameter and the Performance of Nematic Guest—Host Displays*, A. C. Lowe and R. T. Cox, Mo. Cryst. Lig. Cryst., 1981, Vol. 66, pp. 309–318. For simplicity, it is assumed that the nematic has perfect order (S=1).

FIELD-OFF CONDITION

The expressions for the mean field-off refractive index, resolved in the p and s planes are:

$$\bar{n}_{p,\text{off}} = \frac{1}{2}\int_0^{\frac{\pi}{2}} [n_\perp \cos\psi + \sqrt{n_\perp^2 \sin^2\phi + n_\parallel^2 \cos^2\phi}\ \sin\psi]d\psi \quad (3)$$

and $$\bar{n}_{s,\text{off}} = \frac{1}{2}\int_0^{\frac{\pi}{2}} [n_\perp \sin\psi + n_\parallel \cos\psi]d\psi \quad (4)$$

where:

$n_\perp$ is the perpendicular component of the nematic refractive index;

$n_\parallel$ is the parallel component of the nematic refractive index;

$\phi$ is an angle of incidence; and $\psi$ is plane of incidence.

Thus we obtain:

$$\bar{n}_{p,\text{off}} = \frac{1}{2}[n_\perp + \sqrt{n_\perp^2 \sin^2\phi + n_\parallel^2 \cos^2\phi}\ ] \quad (5)$$

and $$\bar{n}_{s,\text{off}} = \frac{n_\perp + n_\parallel}{2} \quad (6)$$

There are two possible configurations for the nematic. In the first configuration, alignment of the nematic director is random in-plane for each nematic layer in the stack. Equations (3) to (6) relate to this condition.

The second NLC configuration uses uniform in-plane alignment, where the alignment direction is rotated by 90° for each successive nematic layer in the stack.

One advantage of this second NLC configuration is that the alignment need not be as uniform as required for twisted nematic liquid crystal (TNLC) displays.

FIELD-ON CONDITION

In the field-on condition, the nematic is oriented perpendicular to the layer plane, and the following expressions are derived.

$$\bar{n}_{p,\text{on}} = \sqrt{n_\perp^2 \cos^2\phi + n_\parallel^2 \sin^2\phi} \quad (7)$$

and $$\bar{n}_{s,\text{on}} = n_\perp \quad (8)$$

In the field-off state, as can be seen from equations (5) and (6), p-polarized light for $\phi=0$, and s-polarized light will not reflect if the dielectric index equals ($\frac{1}{2}$) ($n_\perp + n_\parallel$). However, as seen from equation (6), p-polarized light will reflect for off-normal incidence, where $\phi$ has a non-zero value, and thus, $n_{p,\text{off}}$ does not equal the dielectric index value of ($\frac{1}{2}$) ($n_\perp + n_\parallel$).

In the first configuration of random, in plane NLC alignment, a domain is defined as an area within which the NLC alignment is substantially unidirectional. In the second NLC configuration, each layer in the stack is essentially one domain. For off-normal incidence in the field-off state, some domains will be more highly reflective than others. This results from an effective variation of the plane of incidence, $\psi$, (equations (3) and (4)) from domain to domain. To achieve maximum display contrast, minimizing the reflectivity of the transmitting state is more important than maximizing the reflectivity of the reflecting state.

In contrast to the field-off state, the field-on state is uniform and domain-free. This is because all the molecules are uniformly aligned in the homeotropic orientation. Therefore, the field-on state for a nematic with positive dielectric anistropy ($\Delta\epsilon>0$) provides the optimal transmitting state, where the refractive index of the solid dielectric layers is $n_\perp$, which is matched to $n_{dielectric}$.

At normal incidence, the mirror 100 is polarization independent. This can be seen by setting $\phi=0$ in equations (5) and (7), resulting in equal effective index values for both polarization; ($\frac{1}{2}$) ($n_\perp + n_\parallel$) in the off-field state, and $n_\perp$ in the on-field state.

When the alignment or director alternates by 90° in successive liquid crystal layers, only half the liquid crystal layers will have a refractive index that equal $n_\parallel$. The refractive index of the other half will be equal to the dielectric refractive index, i.e., $n_\perp = n_{dielectric}$. For a symmetric stack, in which there is equal number of layers of each orientation, the reflectivity is the same for either polarization.

Alternatively, if the light is polarized 45° along the optical axis or director of the liquid crystal, then all the liquid crystal layers will have a mismatched index shown in equation (9):

$$n = \sqrt{\frac{n_\perp^2}{2} + \frac{n_\parallel^2}{2}} \quad (9)$$

Equation (9) is derived from equation (7) by setting $\phi=45°$.

If the alignment is random in the layers, then it is a valid assumption that, for a fairly large stack, the random alignments would average out between the layers to give the same answer using either equations (5) and (6) for the off-field/random state, or the equations (7) and (8) for on-field/aligned states.

At other, off-normal, angles of incidence, the effective refractive index, and therefore the reflectivity, for p-polarized light will be angle dependent in accordance with equations (5) and (7). However, for s-polarized light, the refractive indices remain constant.

Figure 5:
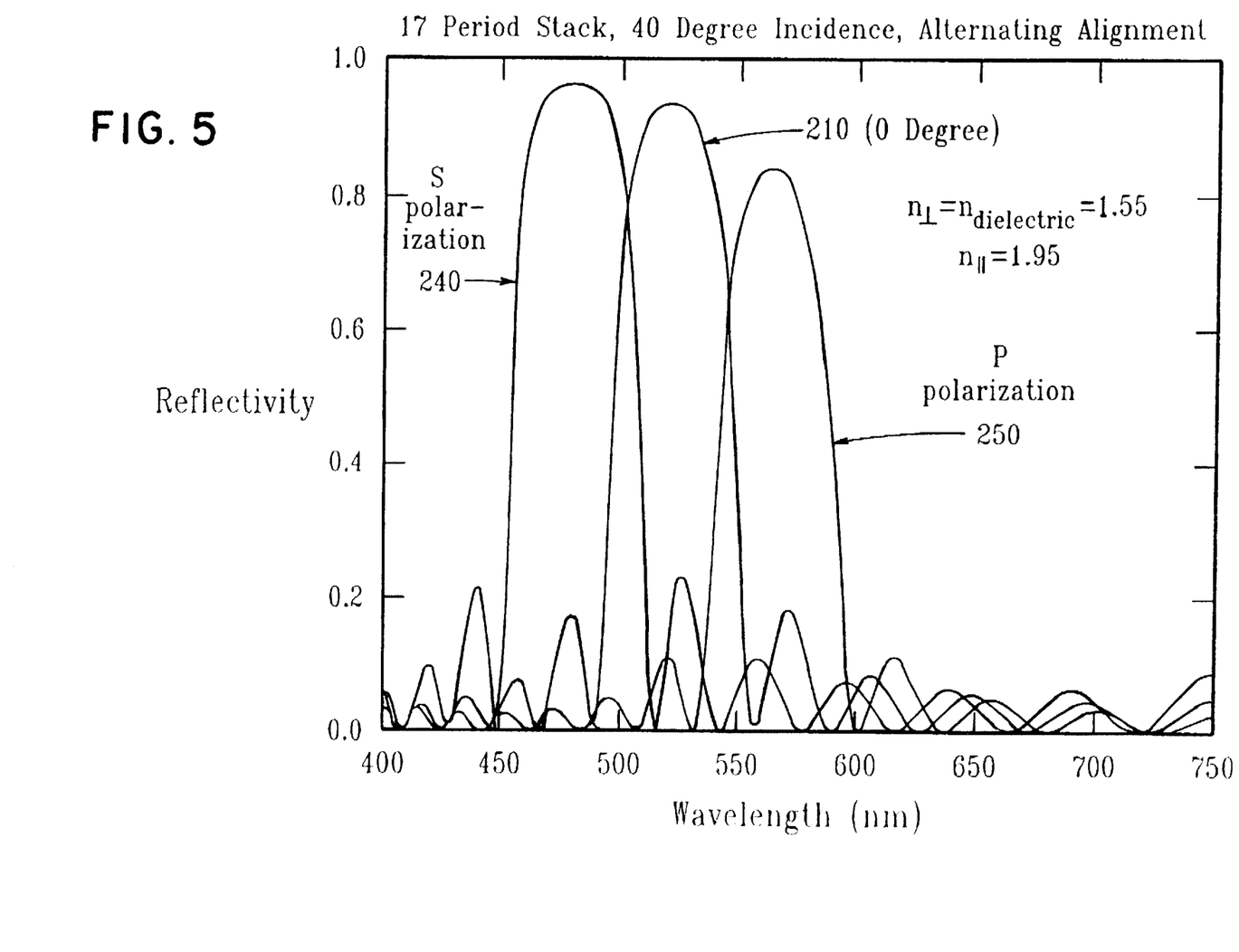
FIG. 5 is a graph of reflectivity versus wavelength, at 40° incident light, illustrating the effect of light polarization incident on the variable index distributed mirror of FIG. 2 according to the present invention.

FIG. 5 is a graph of reflectivity versus wavelength for 40° incidence. FIG. 5 shows the results of calculations for a 17 period stack 105 with $n_\perp = n_{dielectric} = 1.55$ and $n_\parallel = 1.95$. As shown in FIG. 5, reflectivity at 40° incidence remains high, thus providing a wide viewing angle, and high reflectivity and contrast.

Curve 210, which appears in both FIGS. 4 and 5, shows the calculated reflectivity for normal incidence, or zero degree incident angle. Note that the maximum reflectivity for curve 210 is at a wavelength of 520–525 nm. Comparing curve 210 with curve 240 shows that the reflective range shifts to blue color (lower wavelength). In addition, reflectivity increases for the s-polarization. Curve 250 shows that the opposite occurs for the p-polarization where reflectivity is decreased and a shift to higher wavelengths (toward red) occurs.

These effects change the color. However, under normal operation using unpolarized light, these effects will cancel out to the first order. The net result will be a broadening of the reflectivity band.

Figure 6:
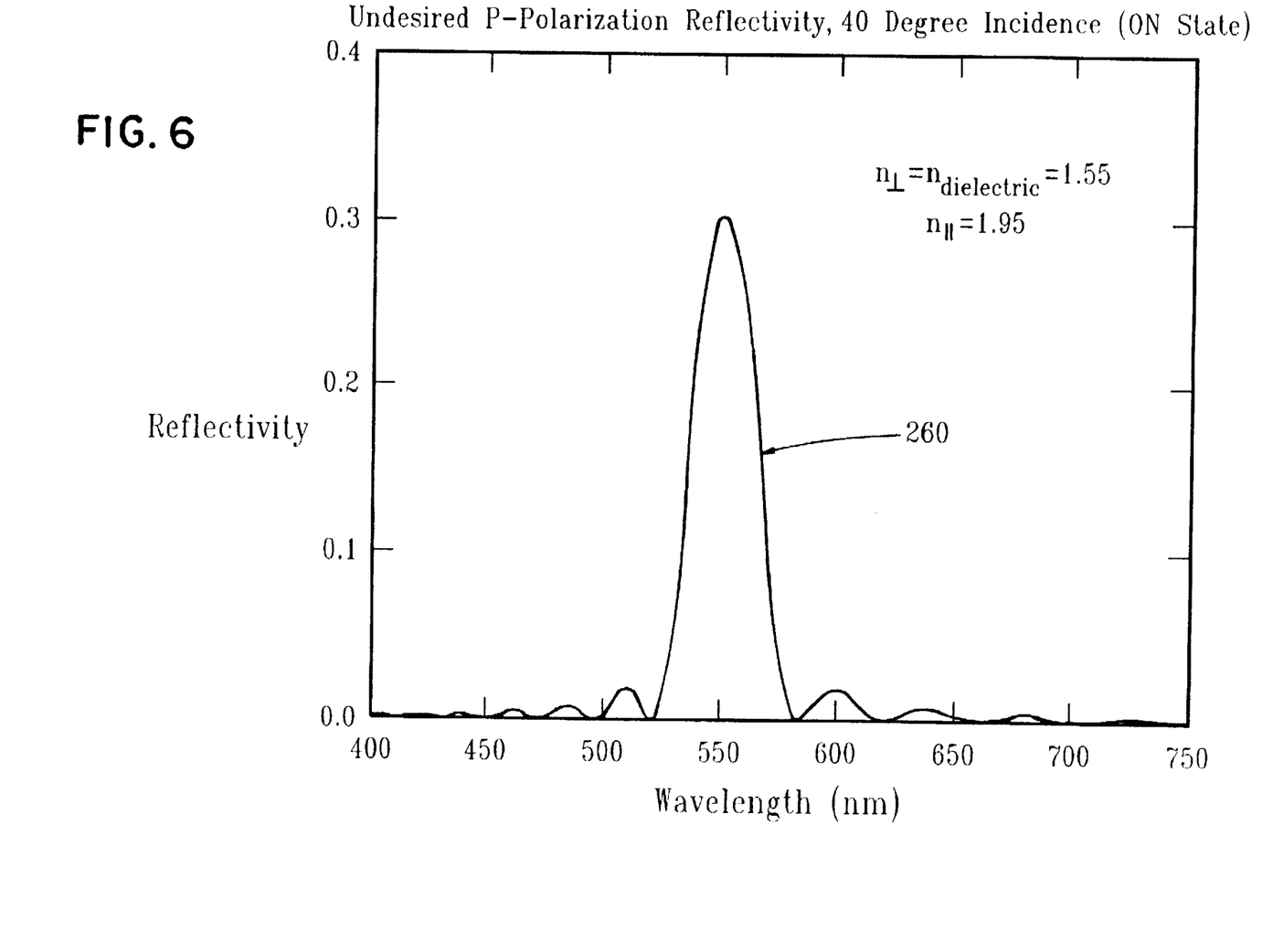
FIG. 6 is a graph illustrating reflectivity versus wavelength of a 40° p-polarized light incident on the variable index distributed mirror of FIG. 2 according to the present invention.

The birefringence also influences the display in the field-on state, and prevents perfect transparency for the p-polarization. Instead of passing through the stack 105, thus rendering the stack transparent, p-polarized off-normal light reflects from the stack 105. FIG. 6 is a graph of reflectivity versus wavelength for p-polarized, 40° incidence, in the field-on condition. FIG. 6 illustrates the undesired p-polarization reflectivity.

At angles away from the normal, the isotropic dielectric maintains the same reflective index, while the index for p-polarized light varies in the liquid crystal 140. Curve 260 shows the calculated parasitic reflectivity for p-polarized light using the same parameters as curve 210 of FIGS. 4 and 5. It is noteworthy that the maximum reflectivity for curve 260 is at a wavelength of 550 nm, as compared to approximately 570 nm for the maximum reflectivity of curve 250 shown in FIG. 5. This will slightly limit the reflectivity in off-axis viewing and also distort the color. Of course, the stack will remain transparent for the s-polarization.

There are conflicting requirements for the refractive index of the nematic. On the one hand, a high index in both the passive dielectric layers 135 and the liquid crystal 140 will reduce the angular dependence of the reflectivity.

On the other hand, for a given difference in refractive index $\Delta n$ (where $\Delta n = n_{of} - n_{on}$), lower values of refractive index increase both $\Delta\lambda$ and the reflectivity of the stack. For maximum display contrast however, the dominant requirement is that $\Delta n$ is maximized. Most nematic materials have $n\perp \approx 1.55$. Thus, the upper limit of $n_\|$ is in the range 1.85–1.95.

The power dissipated in switching or varying a 20 period stacked mirror 100 (i.e., having 20 fixed dielectric layers 135 and 20 variable refractive index layers 140,) is approximately 0.01 watts for an entire typical display, having an area of 500 cm². This power dissipation translates to $2 \times 10^{-5}$ watts/cm². Power consumption and operating voltages are low, since backlights are not needed and low voltage solid state drivers, such as TFTs are used. The inventive mirror has increased contrast and reflectivity because of the high reflectivity of the reflective state, and the low reflectivity of the transparent, or non-reflective, state.

The present invention is described in further detail using an example below. However, it is understood that the present invention is not to be construed as being limited to this example.

Figure 7:
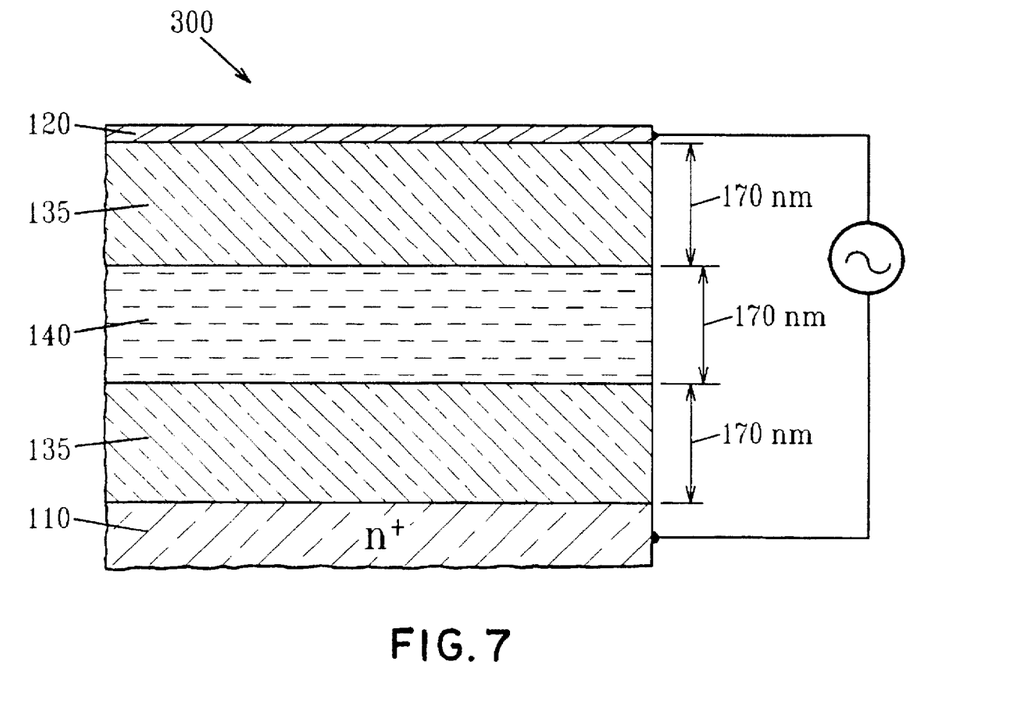
FIG. 7 shows a test structure filled with liquid crystal to test a variable index distributed mirror according to the present invention.

FIG. 7 shows a test mirror 300 which is a simplified version of the mirror 100 of FIG. 2. The test mirror 300 has a single layer of electro-optic variable index (liquid crystal) material 140 sandwiched between layers of fixe index dielectric 135. A test mirror, was fabricated. The thicknesses of the variable index (liquid crystal) material was 170 nm. Amorphous silicon nitride, SiN, was used for the dielectric material 135.

The test mirror 300 was fabricated on a silicon (Si) wafer 110 which is heavily doped with n-type dopant. Two SiN layers 135, each approximately 170 nm thick, and separated by 170 nm, were formed on the substrate 110. Optical and electro-mechanical measurements were used to confirm the existence of the gap between the two layers of SiN 135. A very thin metal was used as the top electrode 120. Illustratively, the thickness of the top electrode 120 is 20 nm, and is made of gold (Au). The gap separating the two layers of SiN 135 was filled with a thin liquid crystal layer 140.

Figure 8:
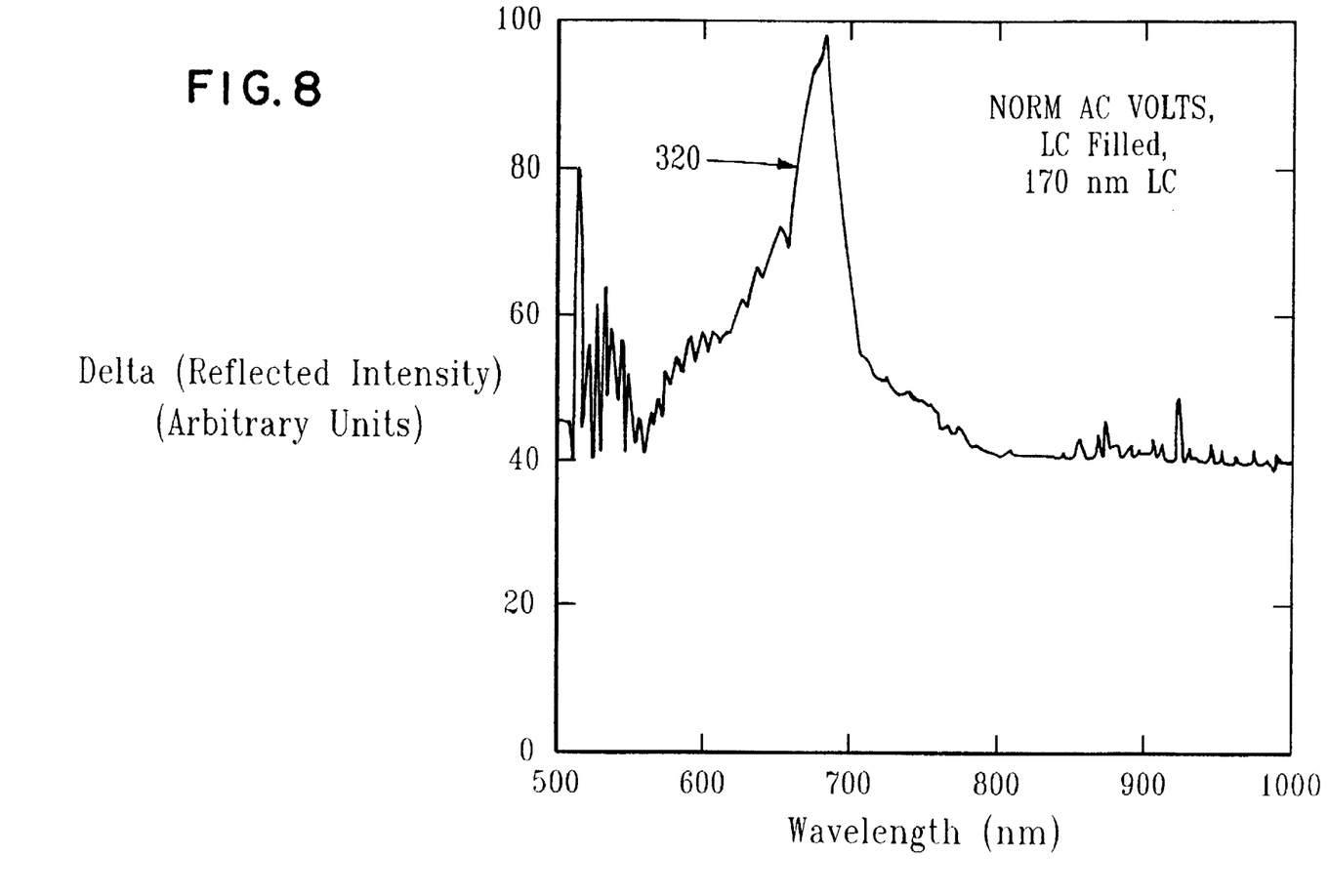
FIG. 8 is a graph of reflectivity versus wavelength, at normal incident light, illustrating the effect of voltage application to the test structure of FIG. 7 according to the present invention.

FIG. 8 shows a graph of reflectivity versus wavelength using an applied AC electric field (3 volts peak to peak, 10 Hz), and detecting only the reflectivity change at the frequency of this applied field of 10 Hz. Curve 320 is the measured reflectivity.

Curve 320 shows that the 170 nm LC layer produced a strong, reproducible, reflectivity signal with a maximum peak near wavelengths between 650 and 700 nm. The maximum absolute reflectivity change was approximately 1% at 670 nm. This peak was reproducible for several test pixels. The pixel size was 200×200 microns.

These results show that it is possible to create dielectric layers separated by a small distance used to form the variable index distributed mirror of the present invention. The test results further show that filling the gap between the dielectric layers with a liquid crystal produces a desired reflectivity modulation.

It is noteworthy that the test structure 300 of FIG. 7 and the associated results shown in FIG. 8 was not made with an optimum (i.e., maximum) mismatch in refractive index between adjacent layers. To increase reflectivity change, from a nearly transparent state to a highly reflective state, the following would be performed:

1. increase the mismatch in the refractive indices of the dielectric and the liquid crystal;
2. increase the number of liquid crystal layers; and
3. optimize the alignment and voltage response of the liquid crystal Because the cavity or gap between the fixed index dielectric layers is very thin (100–200 nm), surface effects can dominate the liquid crystal. Therefore, particular attention is paid to surface alignment effects in an optimized device.

The inventive mirror and display are easy to analyze by viewing a cross-section thereof under a microscope. The inventive electro-optical device is ideal for use as a high resolution reflective display because many desired characteristics are simultaneously achieved. For example, the inventive display is thin and does not require a backlight or polarizer for proper operation. Furthermore, the inventive display consumes low power, operates at low voltages, and has a fast response time. In contrast, electrically switchable holograms and Polymer Stabilizes Cholesteric Textures (PSCTs) have higher operating voltages and lower response times, consume more power, and are not as thin as the inventive electro-optical device.

In addition, the inventive electro-optical device has wide viewing angle, while, at the same time, also has high resolution, reflectivity and contrast, and a large wave band. Therefore, the inventive electro-optical device may be used for displays of portable computers and PDAs (Personal Digital Assistants), notebook computers, electronic books, untethered workstation terminals. The inventive mirror may also be used as the transducer in single target, high resolution color projection systems.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and desired to be secured by Letters Patent is:

1. A vertical distributed mirror, electrically variable between substantially transparent and reflective states, comprising:

a pair of electrodes, alternating layers having discrete interfaces therebetween, said alternating layers respectively being of a first material having a fixed refractive index and a second material having a variable refractive index, said discrete interfaces controlling alignment of said second material, said alternating layers being located between said pair of electrodes, said first material being different from said second material, said variable refractive index of said second material varying in response to a signal applied across said pair of electrodes.

2. The mirror stack of claim 1, wherein said variable refractive index approximately equals said fixed refractive index in said transparent state and differs from said fixed refractive index in said reflective state.

3. The mirror stack of claim 1 further comprising a signal source connected across said pair of electrodes, said signal source providing said signal to said pair of electrodes.

4. The mirror stack of claim 1 further comprising a substrate, wherein a first electrode of said pair of electrodes is formed over said substrate.

5. The mirror stack of claim 4, wherein a second electrode of said pair of electrodes is between one of said alternating layers and a medium, and wherein a difference of refractive indices of said second electrode and said medium is minimized and a difference of refractive indices of said one alternating layer and said second electrode is minimized.

6. The mirror stack of claim 1, wherein a thickness of each of said layers is $\lambda/4$, $\lambda$ being a wavelength of light incident on said mirror stack.

7. The mirror stack of claim 1, wherein thicknesses of said layers are progressively varied from $\lambda/4$, $\lambda$ being a wavelength of light incident on said mirror stack, said progressively thick layers increasing a wave band of said mirror stack.

8. The mirror stack of claim 1, wherein one of said pair of electrodes is a transparent upper electrode, and another of said pair of electrodes is an opaque lower electrode.

9. The mirror of claim 1, wherein said second material is a liquid crystal layer having a molecular axis aligned randomly in a plane approximately parallel to said discrete interfaces between said alternating layers in absence of said signal.

10. The mirror of claim 1, wherein said second material is a liquid crystal layer having a molecular axis aligned uniformly in a plane approximately parallel to said discrete interfaces between said alternating layers in absence of said signal.

11. The mirror of claim 10, wherein said molecular axis of said liquid crystal is rotated 90° for each successive liquid crystal layer.

12. The mirror of claim 1, wherein said second material is a liquid crystal having positive dielectric anisotropy.

13. The mirror of claim 1, wherein said second material is a liquid crystal having negative dielectric anisotropy and is homeotropically aligned.

14. The mirror of claim 1, wherein said first material is one of oxide, nitride, inorganic dielectric and organic polymer.

15. A display comprising a vertical distributed mirror stack electrically variable between substantially transparent and reflective states, said mirror stack comprising:

a first electrode formed over a substrate having a driver, a second electrode, alternating layers having discrete interfaces, therebetween, said alternating layers respectively being of a first material having a fixed refractive index and a second material having a variable refractive index, said discrete interfaces controlling alignment of said second material, said alternating layers being located between said pair of electrodes, said first material being different from said second material, said variable refractive index of said second material varying in response to a signal from said driver.

16. The display of claim 15, wherein said variable refractive index approximately equals said fixed refractive index in said transparent state and differs from said fixed refractive index in said reflective state.

17. The display of claim 15, wherein said mirror stack is tuned to a particular color so that said display is a monochrome colored display.

18. The display of claim 17, wherein each of said layers of said tuned mirror stack has a thickness of a $\lambda/4$, $\lambda$ being a wavelength of said color.

19. A display comprising a vertical distributed mirror electrically variable between substantially transparent and reflective states, said mirror comprising:

a plurality of pair of electrodes, groups of alternating layers having discrete interfaces therebetween and respectively being of one material having a fixed refractive index and another material having a variable refractive index, said discrete interfaces controlling alignment of said another material, different ones of said groups of said alternating layers being located between different pairs of said plurality of pair of said electrodes, said first material being different from said second material.

20. The display of claim 19, wherein said mirrors are tuned to different colors and electrically driven collectively, so that said display is a black and white monochrome display.

21. The display of claim 19, wherein said mirrors are tuned to different colors and electrically driven individually, so that said display is a color display.

* * * * *